June 21, 1966  J. L. BETZEN  3,256,867
ROTARY COMBUSTION ENGINES
Filed Aug. 27, 1962  11 Sheets-Sheet 1

J. L. BETZEN
INVENTOR.

BY *Ely Silverman*
ATTORNEY

June 21, 1966  J. L. BETZEN  3,256,867
ROTARY COMBUSTION ENGINES
Filed Aug. 27, 1962  11 Sheets-Sheet 2
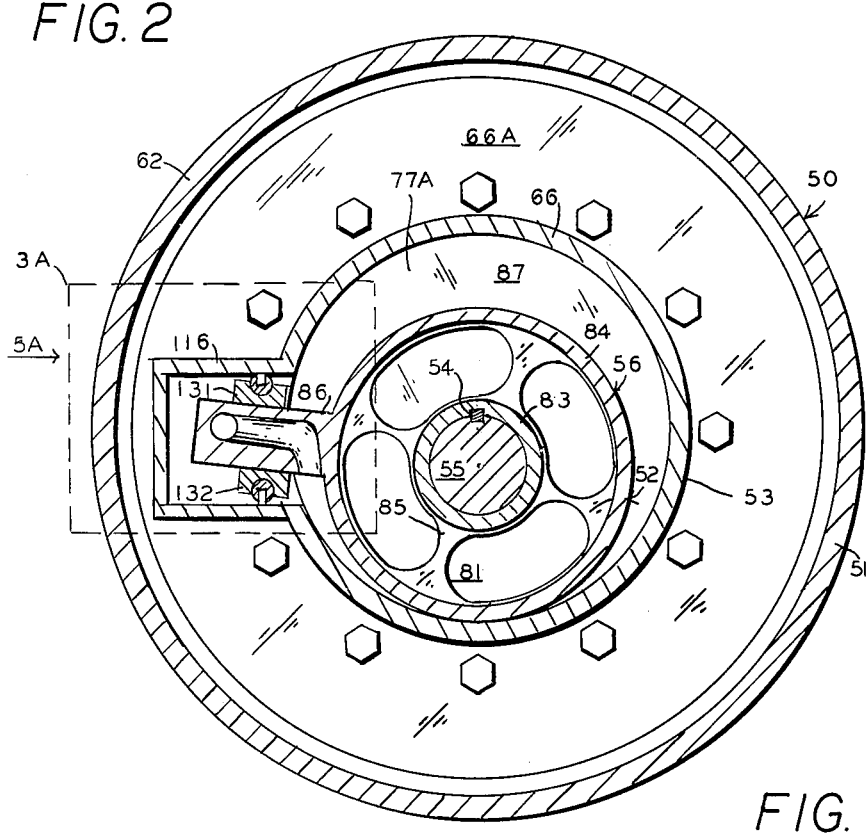
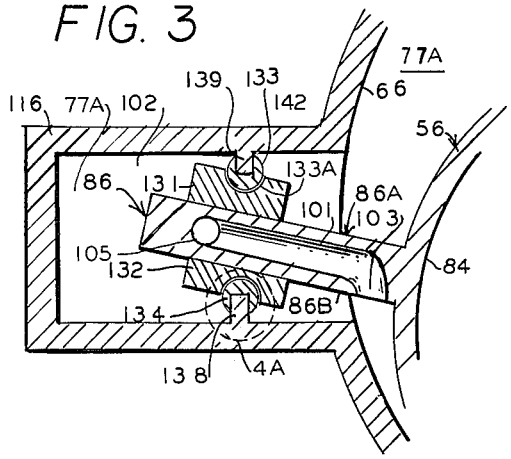
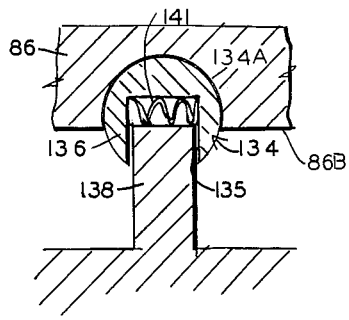
J. L. BETZEN
INVENTOR.
BY Ely Silverman
ATTORNEY

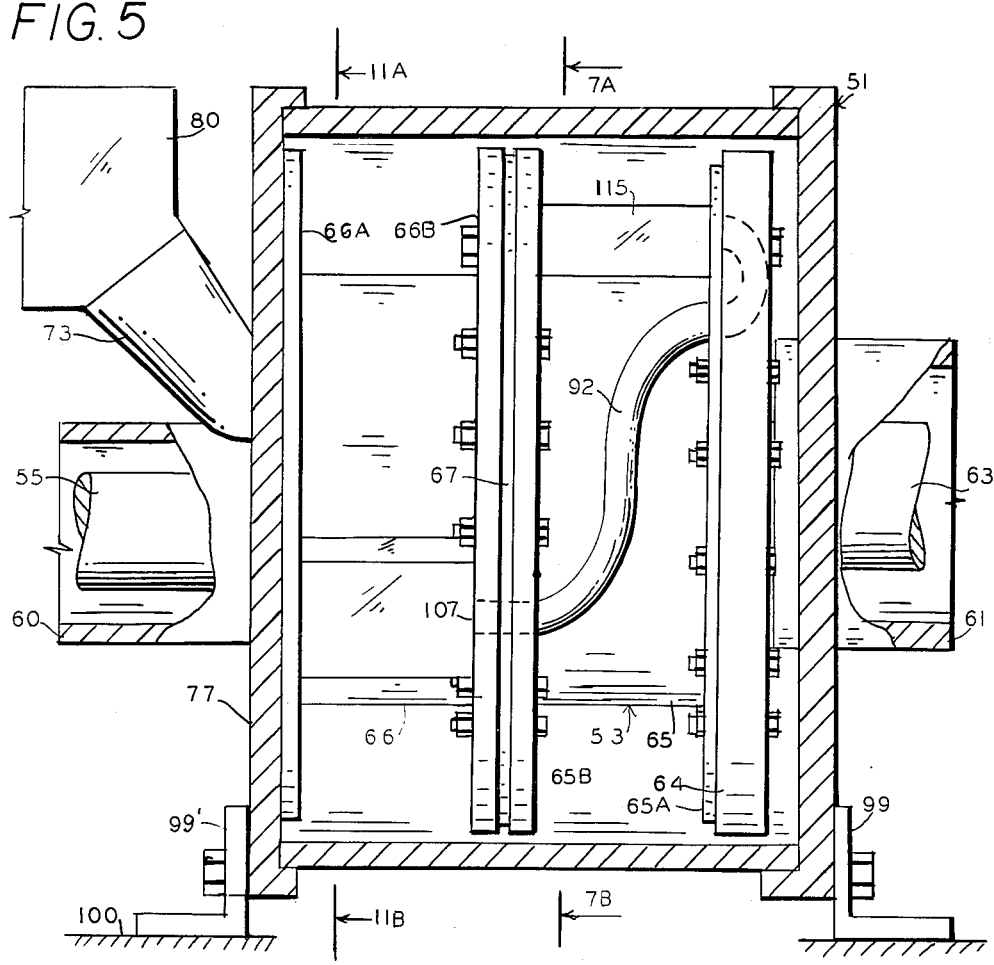
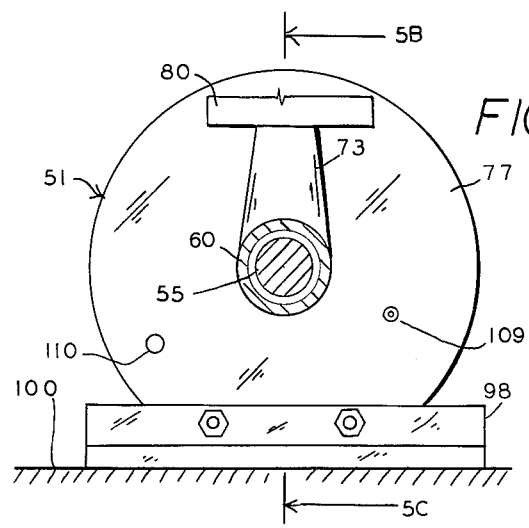

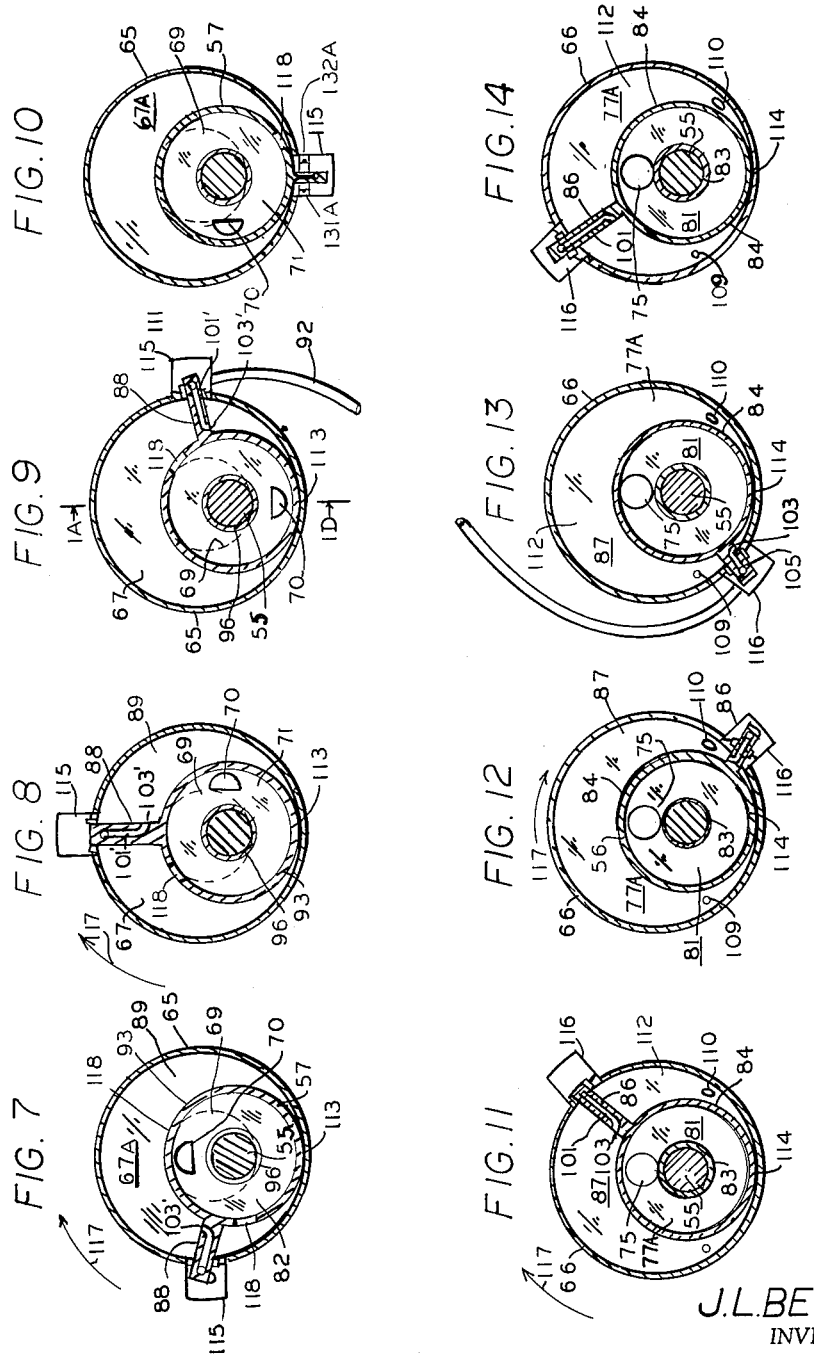

June 21, 1966  J. L. BETZEN  3,256,867
ROTARY COMBUSTION ENGINES
Filed Aug. 27, 1962  11 Sheets-Sheet 5

J. L. BETZEN
INVENTOR.

BY *Ely Silverman*

ATTORNEY

June 21, 1966     J. L. BETZEN     3,256,867
ROTARY COMBUSTION ENGINES
Filed Aug. 27, 1962     11 Sheets-Sheet 6

J.L. BETZEN
INVENTOR.

BY Ely Silverman
ATTORNEY

June 21, 1966  J. L. BETZEN  3,256,867
ROTARY COMBUSTION ENGINES
Filed Aug. 27, 1962  11 Sheets-Sheet 7

J.L.BETZEN
INVENTOR.

BY Ely Silverman
ATTORNEY

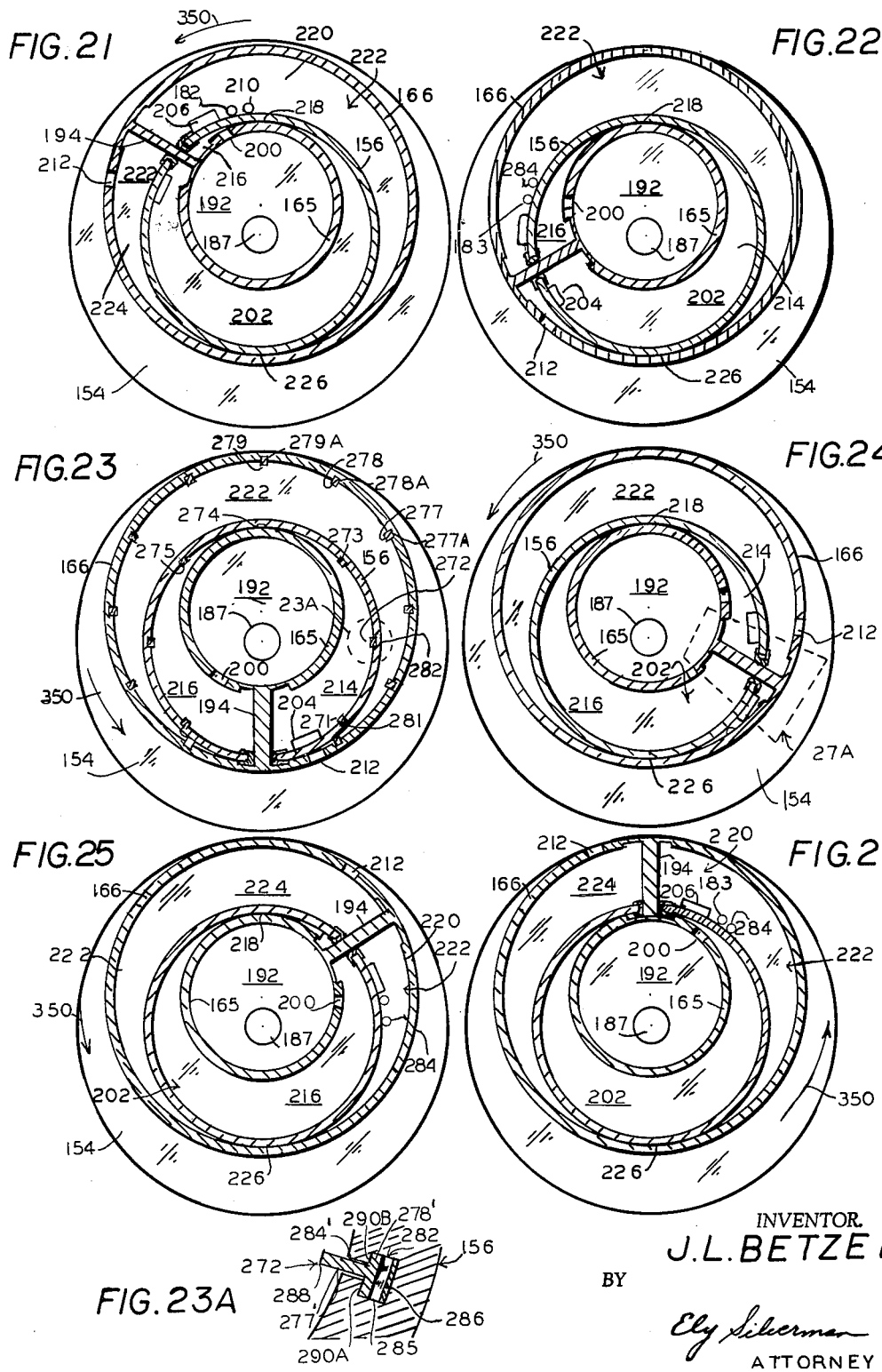

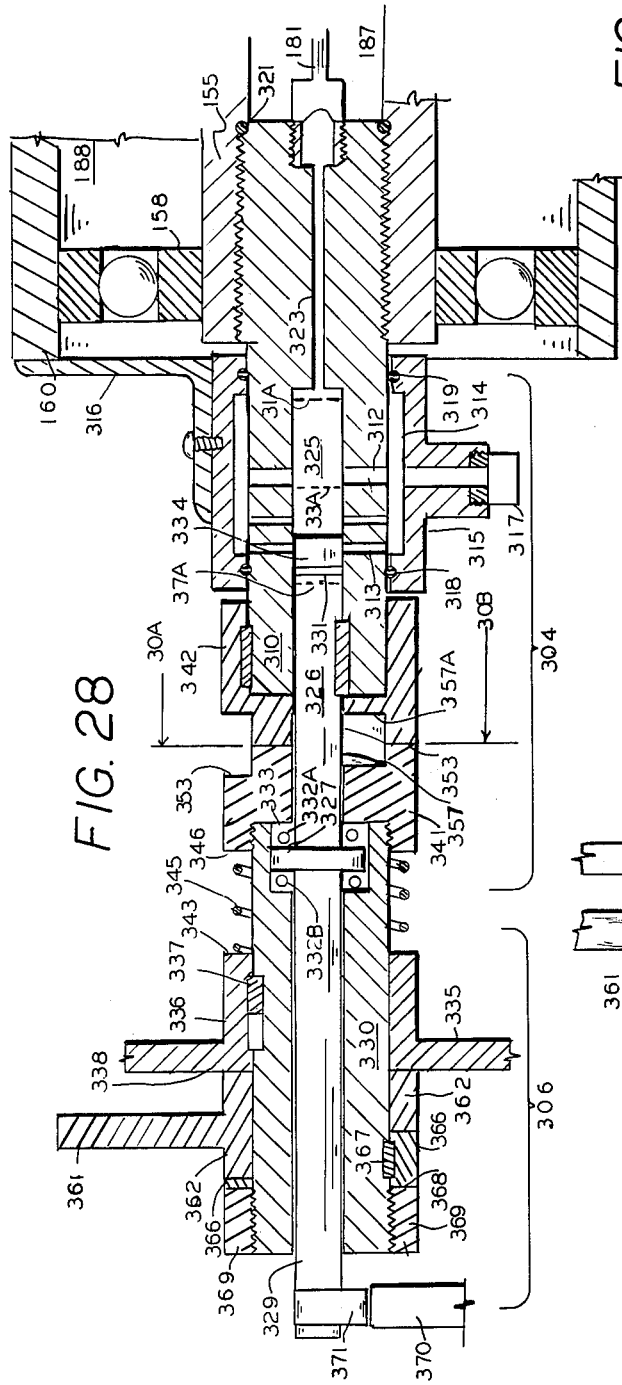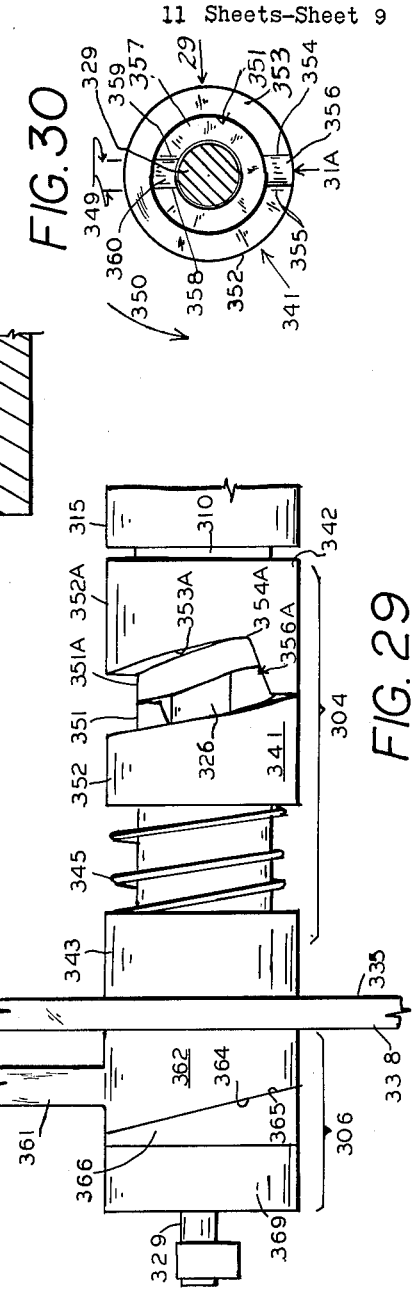

June 21, 1966   J. L. BETZEN   3,256,867
ROTARY COMBUSTION ENGINES
Filed Aug. 27, 1962   11 Sheets-Sheet 10

J. L. BETZEN
INVENTOR.

BY Ely Silverman
ATTORNEY

June 21, 1966 J. L. BETZEN 3,256,867
ROTARY COMBUSTION ENGINES
Filed Aug. 27, 1962 11 Sheets-Sheet 11

J.L. BETZEN
INVENTOR.

BY Ely Silverman
ATTORNEY

United States Patent Office 3,256,867
Patented June 21, 1966

3,256,867
ROTARY COMBUSTION ENGINES
John L. Betzen, Rte. 1, Hereford, Tex.
Filed Aug. 27, 1962, Ser. No. 219,534
11 Claims. (Cl. 123—16)

This application is a continuation-in-part of my patent application Serial No. 15,767, filed March 17, 1960, now U.S. Patent No. 3,075,507 granted January 29, 1963.

This invention relates to an improved engine of the internal combustion type. According to this invention hollow cylinders rotate about the axes of such cylinders to provide compression and combustion chambers of circular outline and crescent shape, which circular outlines of these chambers change relative to each other during the operation of the engine.

One object of this invention is to provide internal combustion engines of a very great power to weight ratio.

Another object is to provide internal combustion engines with very few moving parts.

Another object is to provide a fuel injection system for such rotary internal combustion engines.

Yet another object of this invention is to provide internal combustion engines of improved thermal and mechanical efficiency and requiring no muffler.

Other objects and advantages of this invention will be apparent to those skilled in the art on the study of the below disclosure of which the drawings attached hereto form a part and wherein like numerals denote like parts in the various figures, and wherein:

FIGURE 2 is a transverse cross-sectional view taken along section 2A–2B of FIGURE 1;

FIGURE 3 is a detailed view of the mechanism in zone 3A of FIGURE 2;

FIGURE 4 is an enlarged view of zone 4A of FIGURE 3;

FIGURE 5 is a side view, partly broken away, along section 5B–5C of FIGURE 6 taken along the direction of the arrow 5A in FIGURE 2 with the components oriented as in FIGURES 8 and 13;

FIGURE 6 is an end view, partly in section, of the embodiment shown in FIGURE 1 viewed along the section 6B–6C in FIGURE 1;

FIGURES 7, 8, 9 and 10 are transverse sections, shown diagrammatically and on reduced scale, taken through section 7A–7B of FIGURE 1 and FIGURE 5 during operation of the embodiment of FIGURES 1–5.

FIGURES 11, 12, 13 and 14 are transverse sectional views, shown diagrammatically on reduced scale, taken through zones 11A–11B of FIGURE 1 and FIGURE 5 during operation of the embodiment of FIGURES 1–5;

Figure 17:
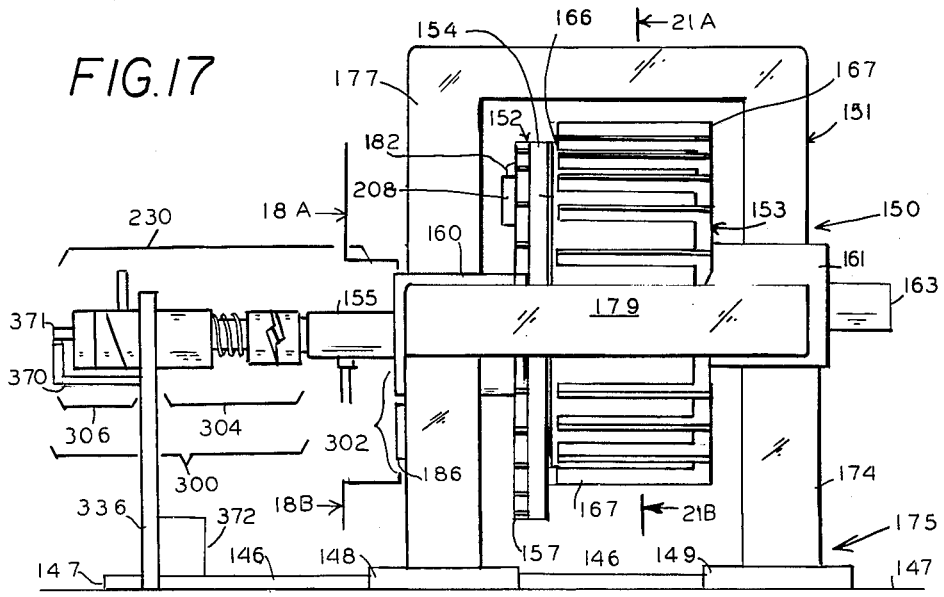
FIGURE 17 is a side view of another embodiment of this invention.
Figure 27:
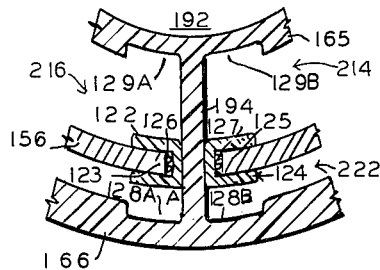
Figure 31:
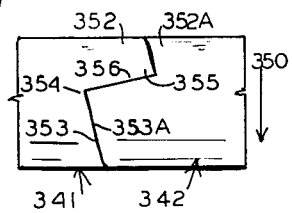
Figure 32:
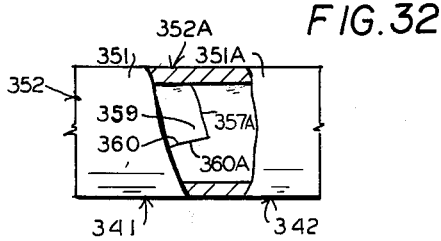
Figure 33:
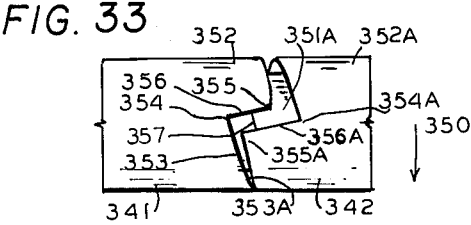
Figure 34:
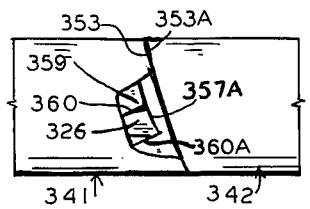
Figure 35:
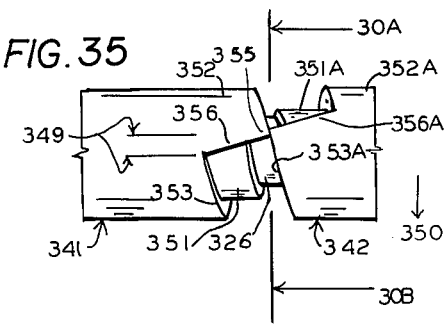
Figure 36:
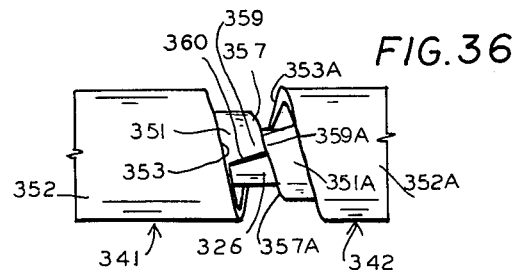
Figure 37:
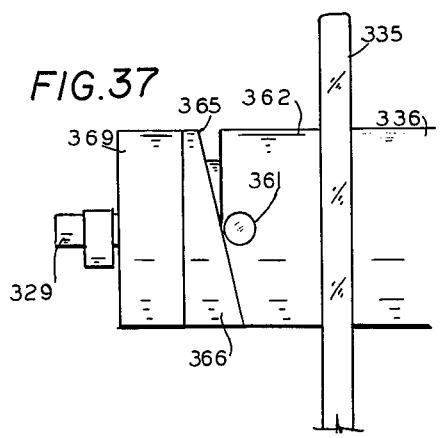
Figure 38:
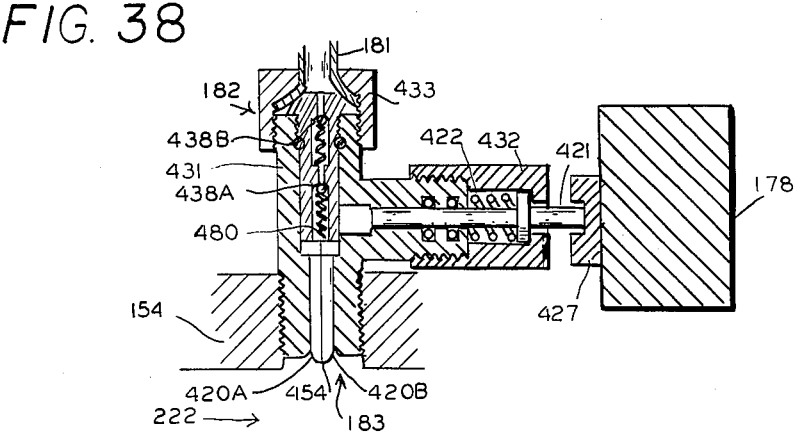
Figure 39:
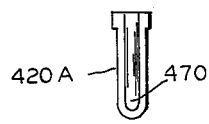
Figure 40:
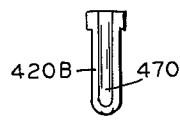
Figure 41:
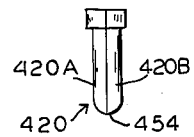
Figure 42:
Figure 43:
Figure 44:
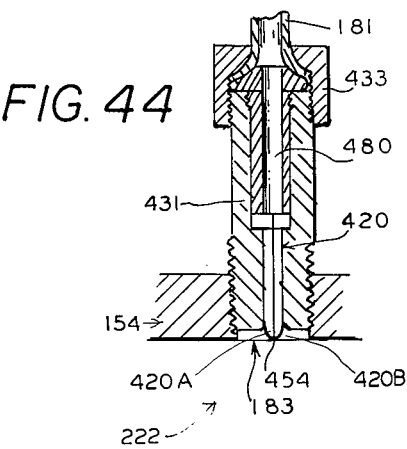

FIGURES 21, 22, 23, 24, 25, and 26 are diagrammatic transverse cross-sectional views of the apparatus of FIGURE 17 taken along that section indicated as 21A–21B in FIGURE 17;

FIGURE 23A is an enlarged view of the apparatus in zone 23A of FIGURE 23;

FIGURE 27 is an enlarged view of the apparatus in zone 27A of FIGURE 24;

FIGURE 28 is a longitudinal cross-sectional view of the fuel injector mechanism 304 and fuel adjustment sub-assembly 306 of the apparatus of FIGURE 17 in the position of component parts thereof shown in FIGURE 29;

FIGURE 29 is an enlarged right hand side view of the fuel injector mechanism in the cam position shown in FIGURES 35 and 36;

FIGURE 30 is a cross-sectional view along plane 30A–30B of FIGURE 28 and FIGURE 35;

FIGURE 31 is a bottom view of the fuel injector cam sub-assembly along the direction of arrow 31A of FIGURE 30 at the full closed position of the fuel injector 334 corresponding to position 31A shown by dashed lines in FIGURE 28;

FIGURE 32 is a top view, partly broken away, of the fuel injector cam sub-assembly in the same operative position as shown in FIGURE 31;

FIGURE 33 is a bottom view, taken as in FIGURE 31, of the fuel injector cam sub-assembly in the position corresponding to the position 33A shown by dashed lines in FIGURE 28 of the piston 334;

FIGURE 34 is a top view of the fuel injector sub-assembly in the same operative position of piston 334 as shown in FIGURE 33;

FIGURE 35 is a bottom view of the fuel injector cam sub-assembly in the full open position of the piston 334 as shown in FIGURES 28 and 29;

FIGURE 36 is a top view of the fuel injector cam sub-assembly in the same operative position as shown in FIGURE 35;

FIGURE 37 is a side view of the speed control sub-assembly corresponding to a full open position of piston 334 as shown at the position shown by the dashed line indicated as 37A in FIGURE 28;

FIGURE 38 is an enlarged cross-sectional view of a fuel injector sub-assembly within the scope of this invention taken along the axis of its shaft 421;

FIGURES 39 and 40 are, respectively, interior views of nozzle elements 420A and 420B of jet 420;

FIGURES 41, 42, and 43 are, respectively, side, top, and bottom views of jet 420;

FIGURE 44 is a longitudinal cross-sectional view of a jet nozzle and its housing used in the apparatuses of this invention as injector 182; and FIGURES 7 and 11 are drawn to the same scale and the elements are therein shown at their relative positions at the same point in the cycle of operation of the apparatus of FIGURES 1 through 5; FIGURES 8 and 12 are drawn to the same scale as FIGURES 7 and 11 and the elements of FIGURES 8 and 12 are shown at their relative positions at the same point in the cycle of operation of the apparatus of FIGURES 1 through 5, this point being subsequent in time by one-fourth cycle to that point in the cycle shown in FIGURES 7 and 11.

FIGURES 9 and 13 correspond as do FIGURES 8 and 12, with the FIGURES 9 and 13 showing positions of elements at a point one-fourth cycle subsequent to that shown in FIGURES 8 and 12. FIGURES 10 and 14 correspond as do FIGURES 7 and 11 with the FIGURES 10 and 13 showing positions of elements at a point one-fourth cycle subsequent to that shown in FIGURES 9 and 13.

Figure 1:
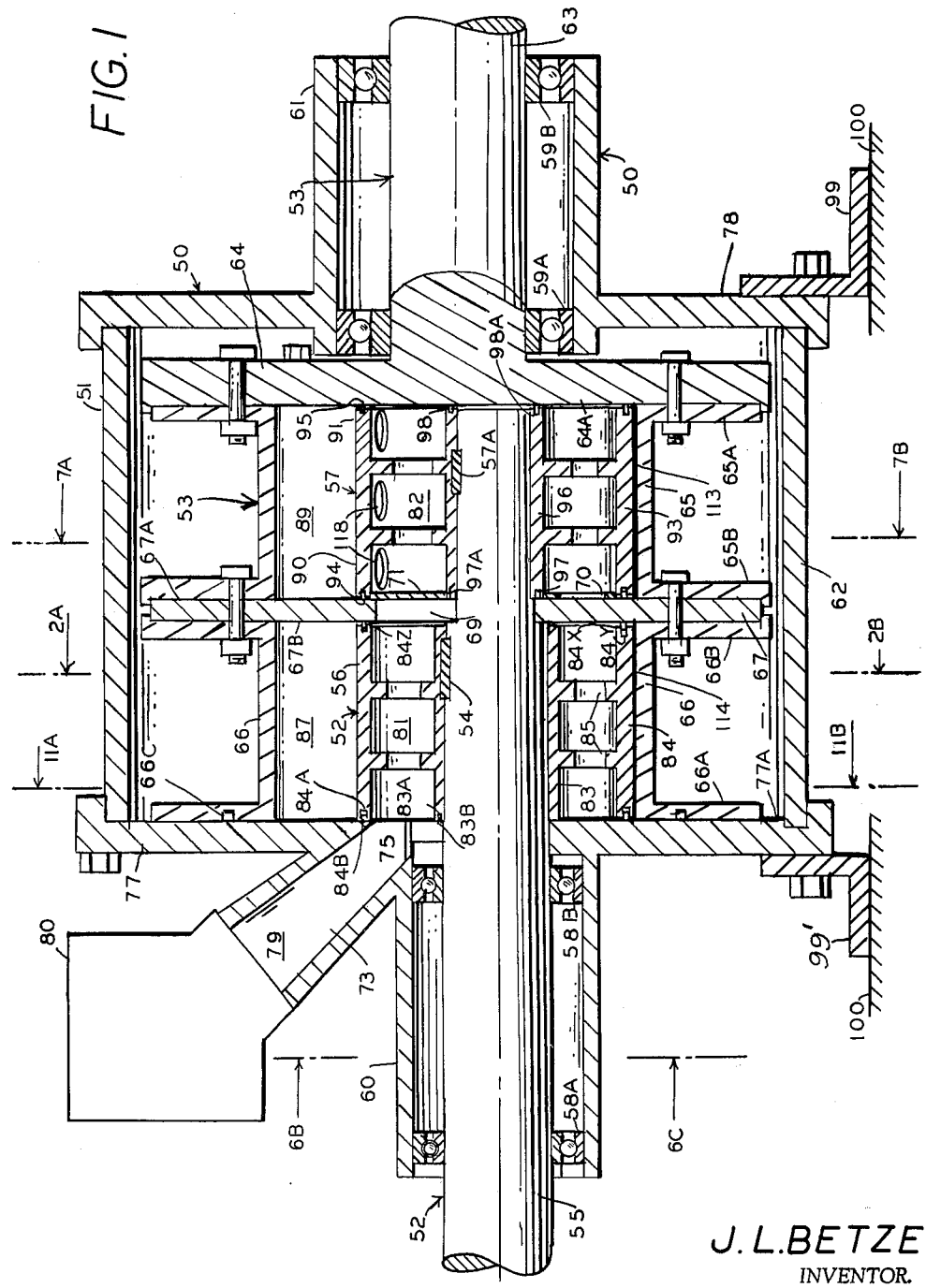
FIGURE 1 is a longitudinal cross-sectional view along plane 1A–1D of FIGURE 9, showing one embodiment of this invention.

The embodiment of FIGURE 1, generally shown as 50, comprises a fixedly supported exterior housing shell 51, and, rotatably supported therein, a first rotating or drive sub-assembly 52 and a second rotating or compressor sub-assembly 53.

Housing shell 51 comprises lateral input housing 60 supported on a vertical heavy steel end wall 77, a sectional heavy steel end wall 78 supporting a lateral output bearing housing 61 and a cylindrical housing shell 62 firmly joined at its ends to said plates 77 and 78. At their bottom portions plates 77 and 78 are fixedly supported, as by feet 99' and 99 to the ground 100.

The major portions of the rotatable sub-assembly 52 comprise a cylindrical axially rotatable horizontal compressor shaft 55, a first hollow cylindrical interior combustion housing or shell 56 concentric with said shaft and keyed thereto by key 54 and a hollow interior compressor housing or shell 57 which smoothly fits on and is concentric with and is keyed at 57A to such shaft 55. The cylindrical compressor shaft 55 is rotatably supported on axially spaced apart co-axial needle bearings 58A and 58B, the housings of which bearings are fixedly located in the lateral input housing portion 60 of the housing shell 51.

The major portions of the second or compressor sub-assembly 53 comprise a cylindrical axially rotatable horizontal drive shaft, 63, firmly attached to a vertical flat circular face-plate 64, an outer cylindrical hollow compressor shell 65 concentric with the shaft 63 and attached by flanges 65A to and supported by face plate 64, a vertical ¼ in. thick flat circular shaped steel diaphragm plate 67, which plate is fixedly attached to shell 65 by its flange 65B and a hollow cylindrical outer combustion shell 66 firmly attached by its flange 66B to plate 67 and co-axial with hollow cylindrical shell 65. The axes of shafts 55 and 63 are parallel to each other and spaced away from each other by about one inch in the preferred embodiment of FIGURE 1. Shaft 63 is rotatably supported in axially spaced apart co-axial needle bearings 59A and 59B which are firmly located in the lateral drive or output housing portion 61 of housing shell 51.

Diaphragm plate 67 has a centrally located circular orifice 69 having its center in line with the axis of shaft 63 and has a radius equal to the sum of the radius of cylindrical shaft 55 plus the distance between the axes of shafts 63 and 55. This size of the orifice permits shaft 55 to move freely therein as below described. Periodically, as below described, an orifice 70 in the vertical end wall 71 of shell 57 and orifice 69 in diaphragm plate 67 are continuous with each other.

An inlet conduit 73 passes through an inlet orifice 75 in the vertical end wall, 77, of the casing 71. It provides for passage of a gas, or combustible gasoline-air gas mixture as 79 formed in the conventional carburetor 80, into the annular chamber 81 between the cylindrical walls 83 and 84 that form the inner hollow cylindrical housing 56. Ribbing members as 85 between walls 83 and 84 in the shell 56 are perforated with such perforations occupying the major cross-sectional area of such ribbing member measured in a vertical plane (normal to the longitudinal axis of housing 56) to provide a passageway for the injected gas mixture 79 through the shell 56 and thence, via orifice 69, to the orifice 70 in the shell 57 and so permits passage of the gas or combustible mixture from inlet 75 into the annular chamber 82 in shell 57 between inner cylindrical wall 96 and outer wall 93 of said shell.

The end edges of walls 83 and 84 of shell 56 are grooved as at 83A and 84A and those grooves are each provided with sealing rings, 83, 83B and 84B respectively, where each such horizontally elongated cylindrical wall contacts a flat vertical wall as end wall 77 and the vertical flat wall 67B of diaphragm plate 67. These seals and walls 83, 84, 77 and 67 form a gas tight seal although said vertical walls are movable relative to said end edges of the cylindrical walls. A similar groove and seal in such groove is provided at the free flange edge, 66A, of shell 66 for location of a sealing ring 66C to form a gas tight seal between each of said flange edges and the inner surface of the inner flat tsurface 77A of the wall 77. The rear edge 84X of wall 84 of shell 56 opposite to the edge 84B is also grooved, as at 84A, at 84Y and is provided with sealing ring 84Z for a gas tight seal with wall 67B.

The outside radius of the shell 56 plus the length of the displacement of the axis of shaft 55 from the axis of shaft 63 is the internal radius of shell 66. The outside radius of shell 57 plus the length of displacement of the axis of shaft 55 from the axis of shaft 63 is the internal radius of shell 65. The outside of shell 57 contacts the inside of shell 65 along a line of contact 113 with a substantially gas-tight seal. The outside of shell 56 contacts the inside of shell 66 along a line of contact 114 with a substantially gas-tight seal. Lines 113 and 114 parallel the axes of shafts 55 and 63.

The edges 90 and 91 of the outer wall 93 of shell 56 are grooved and provided with sealing rings 94 and 95, respectively, to form a gas tight seal with the inner flat vertical wall 67A of plate 67 and with the adjacent flat wall 64A of plate 64, although such walls and shell are movable relative to each other. Each of the ends of the inner wall 96 of the compressor housing 57 is also provided with sealing rings as 97 and 98 in corresponding grooves therefor 97A and 98A to effect a gas tight seal between those elements.

A first, drive chamber ear plate 86 is fixedly attached to the outside of shell 56 for the full length thereof. It is provided at each of its ends with sealing elements to provide a gas tight seal with flat wall surfaces 67B and 77A. This ear projects through the crescent shaped space 87 between shells 66 and 56 and is slidably yet gas tightly held by sealing blocks as 131 and 132 in valve receptacle 116 as below described. The sides of ear 86 are smooth, flat and imperforate.

A second, driven compressor chamber ear plate 88 is fixedly attached to the outside of shell 57 for the full length thereof. It is provided at its ends with sealing elements to provide a gas-tight seal with the flat inner surface 64A of wall plate 64 and the adjacent flat surface 67A of diaphragm plate 67. This ear projects through the crescent shaped space 89 between the shells 57 and 65 and is slidably yet gas tightly held by sealing blocks such as 131A and 132A in valve receptacle 115.

During operation, the gaseous mixture 79 passes through orifices 118 in wall 93 of shell 57 to pass to the upper side (as shown in FIGURES 1 and 7) of the lug or ear 88. Gaseous mixture 79 passes into the space 89 between shells 57 and 65 by the vacuum there developed, as below described, until the orifice 70 loses continuity with the orifice 69 in the plate 67 as shafts 55 and 63 continue to rotate in the clockwise direction of arrow 117 of the FIGURES 7-8 and 11-12. Then, as the ear 88 of the shell 65 extends the full length of the chamber 89 and closes the gap between shell 57 and shell 65 it acts, on said clockwise rotation of those shells, to prevent escape of mixture 79 and to compress such gaseous mixture during rotation as shown in FIGURES 7, 8 and 9.

A U-sectioned valve receptacle 116 opening to chamber 87 is attached to the periphery of the shell 66 with the longitudinal axis of the U radially extending from the shell 66 and a similarly U-shaped valve receptacle 115 open to space 89 is attached to the shell 65. The U-sectioned receptacles project laterally from the shell 65 and 66, respectively, with a 140° difference in phase, with the central longitudinal axis of the combustion chamber receptacle 116 leading the central longitudinal axis of receptacle 115 for the compression chamber 89, as measured in a clockwise direction.

The ears 86 and 88 are each provided with a channel, as 101 in 86, therein that open—as via opening 103—to the adjacent chamber or space as 87. The channel 101 also has an opening 105 that is sealed, except for a limited portion of the operating cycle, below described, by the end wall 67B for chamber 116. An orifice 107 in that wall connects during a limited portion of the operating cycle to one end of a conduit 92 which conveys compressed gaseous or gaseous combustible mixture thereto. The other end of conduit 92 connects to receptacle 115. Receptacle 115 encloses structures as in receptacle 116. Ear 88 has a passageway therethrough, as 101, and one end thereof has an orifice as 103 open to chamber 89 and the other end of said passageway is connected to an orifice 111 in ear 88 which is open during the phase of shells 56, 57, 65, and 66 as shown in FIGURES 9, 10, 13 and 14 operatively connected—i.e. open—to conduit 92 whereby to pass compressed air or combustible gas from compression chamber 89 to combustion chamber 87. At all other positions the orifices 105 and 111 are so positioned relative to such orifices of such conduit 92 as to not connect the passageways in the ears 86 and 88 with that conduit.

As shown in FIGURES 2 and 3, the flat upper and lower surfaces 86A and 86B of ear 86 slides against similarly flat surfaces of sealing blocks 131 and 132 and form a gas-tight seal therewith. These blocks extend the length of the ear as 86 and are rotatably and resiliently held in position by generally cylindrically shaped heads 133 and 134. The blocks 131 and 132 each have matching curved orifices 133A and 134A, respectively, therein to smoothly and rotatably receive such heads. The interior of each such head as 134 has a slot 135 which is rectangular in shape and forms a sliding smooth-fitting skirt as 136 which is held against and extends over an imperforate wall as 138 (and 139 for head 133) of rectangular shape corresponding to a tight yet slidable fit into slot 135. Walls as 138 and 139 are each supported on and firmly attached to the receptacle therefor. Each head, as 134, is spring urged—as by spring 141—towards its ear 86 and thereby provides for resilient, yet gas-tight, positioning of each such ear, as 86, on each block such as 131 and 132. Thus the blocks as 131 and 132 are slidably and in gas-tight engagement with ears as 86. A similar structure is provided for ear 88. The blocks 131 and 132 rotate about their cylindrical pivot heads as 133 and 134 and the pivot heads are in turn fixed in position vertically and resiliently by the rectangular walls as 138 and 139, which walls are in turn fastened to a receptacle as 115 on shell 65 or 116 on shell 66 respectively.

As the shells 65 and 57 rotate from the position of FIGURE 7 to the position shown in FIGURE 9 the gas mixture in chamber 89 is highly compressed—usually to a 7 to 1 or a 9 to 1 ratio. The conduit 92 then conducts the compressed gas via inlet orifice as 107 in chamber 116 to the space 87 between outer shell 66 and its inner shell 56. The shell 56 has gas-tight seals with walls 77A and 67B although rotatable with respect thereto and is rotatably contained in the outer shell 66 (supported on the shell 65) as shown in FIGURES 1 and 11 through 14. In the position of chambers 87 and 89 shown in FIGURE 10 and FIGURE 14 the conduit between chambers 87 and 89 is closed by movement of ears 86 and 88. The combustible mixture then in chamber 87 is ignited by the conventional ignition spark plug 109 in the wall 77. This spark plug periodically fires in fixed relation to the rotation of the cylinders 56 and 66 in the same manner as any other magneto fires at a definite point in the cycle in an internal combustion engine. Combustion of the compressed combustible gaseous mixture at a point in the cycle as shown in FIGURE 14 results in expansion of the combustion gases resulting from such combustion. Such expansion moves the ear 86, and the attached shell 56, because of expansion of the gas in the gas-tight volume bounded by contact line 114, shells 56 and 66, walls 77A and 67B and ear 86 through the sequence shown in FIGURES 11, 12, and 13. In this sequence the ear 86 extends the full length of the chamber 87 and provides a ledge which blocks off escape of the combustion gases until the scavenging outlet or exhaust outlet 110 in the wall 77 is exposed as in position of elements as shown in FIGURE 12. The ignition of combustible mixture subsequently added into chamber area 87 between the shells 56 and 66 and combustion and expansion of that subsequently added mixture causes the ear 86 to again be driven clockwise around the shaft 55 and to force completion of the exhaustion of the previously combusted gases remaining in zone 112 of FIGURES 11 and 14 (to the right or clockwise position of ear 86) through the orifice 110 in the fixed end wall 77.

Figure 18:
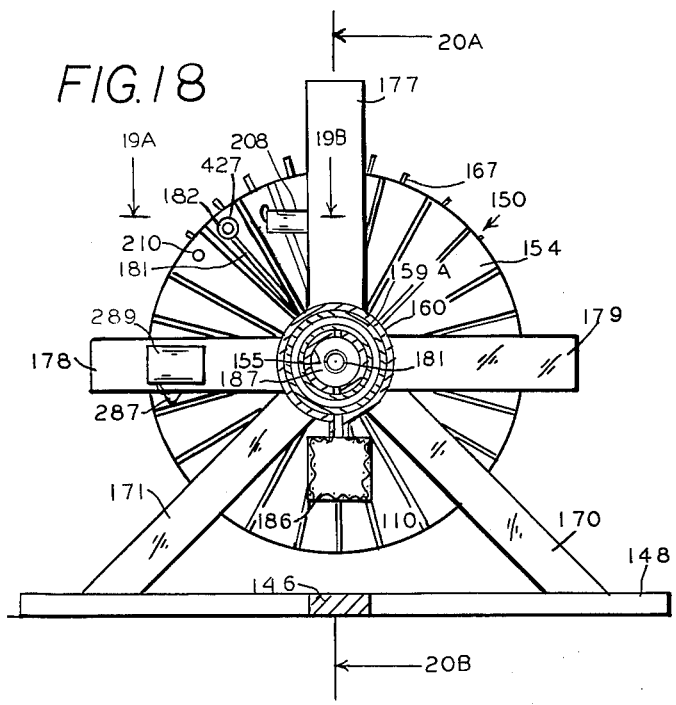
FIGURE 18 is an end view of the apparatus of FIGURE 17 as seen along section 18A–18B of FIGURE 17.
Figure 19:
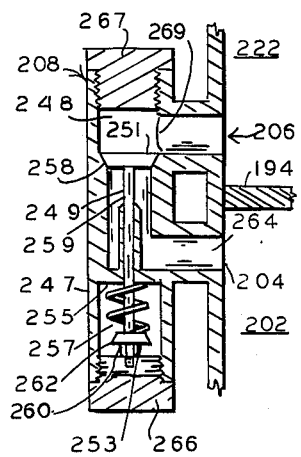
FIGURE 19 is a sectional view along plane 19A–19B of FIGURE 17.
Figure 20:
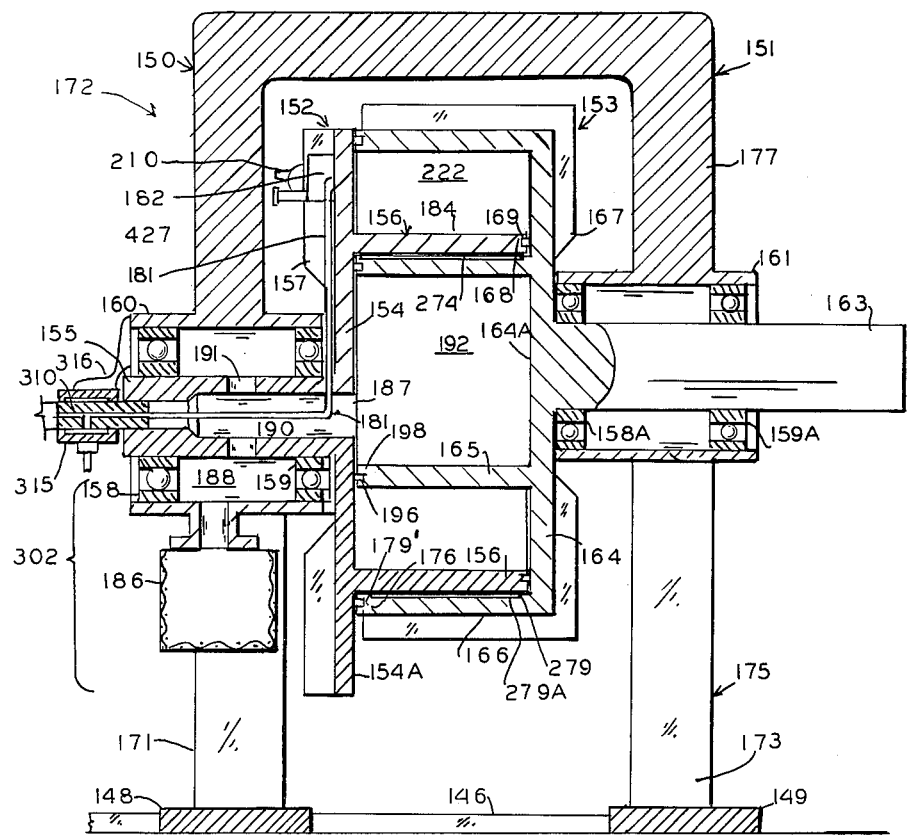
FIGURE 20 is a longitudinal vertical sectional view of the apparatus of FIGURE 17 taken along the plane indicated as 20A–20B on FIGURE 18.

The embodiment shown in FIGURES 17, 18 and 20 and generally indicated as 150, comprises a fixedly supported exterior support framework 151 and, rotatably supported therein, a first rotating sub-assembly 152 and a second rotating sub-assembly 153. The support framework 151 is fixedly supported on the ground, 147, by its feet 148 and 149.

The major portions of the rotatable sub-assembly 152 comprise a cylindrical axially rotatable horizontal hollow shaft 155, a flat circular end plate 154 with its center on the axis of shaft 155, said end plate firmly fixed to shaft 155, a first hollow cylindrical housing or shell 156 concentric with shaft 155 and fixedly attached to end plate 154. The shaft 155 is rotatably supported on axially longitudinally spaced apart co-axial needle bearings 158 and 159, which bearings are fixedly located in a lateral bearing housing portion 160 of the exterior support framework 151.

Cooling fins 157 are attached to the outside surface of plate 154 for a cooling effect as hereinbelow described.

The major portions of the second or drive sub-assembly 153 comprise an axially rotatable horizontal drive shaft 163 firmly attached to a vertically flat circular face plate 164, a cylindrical hollow shell 165 of a substantially smaller outer diameter than the inner diameter of shell 156, coaxial with and concentric with shaft 163 and firmly attached to the central portion of the vertically flat circular end plate, 164, and supported thereby.

End plate 164 is a ½-inch thick flat steel plate, in the preferred embodiment. An outer hollow cylindrical shell 166 housing of inner diameter substantially greater than the outer diameter of shell 156 is firmly attached to the end plate 164 at the periphery thereof. The axis of this cylindrical shell 166 is co-linear with the axis of shell 165 and shaft 163. The axes of shafts 155 and 163 are parallel to and spaced apart from each other by about 2½ inches in the preferred embodiment. Shaft 163 is rotatably supported in axially spaced apart co-axial needle bearings 159-A and 158-A which are firmly located in a lateral drive or output housing portion 161 of the framework support 151. Cooling fins 167 are attached to the end plate 164 and to the outer periphery of the shell 166 as hereinafter described.

The supporting framework 151 generally comprises legs 170 and 171 at the feed end, generally shown as 172, of embodiment 150. These legs are joined to and support housing portion 160, and similar rear end legs 173 and 174 are joined to and support housing portion 161 at the output or power end generally shown 175. A vertical U-shaped bridge 177 and horizontal U-shaped bridges 178 and 179 formed of heavy steel I-beams or tubing provide for a rigid support of the bearing housing portions 160 and 161 relative to each other while not interfering with the cooling action of the fins as 167 and 157.

An inlet conduit tube 181 passes through a central chamber 187 inside shaft 155 for transmission of a combustible fuel to a nozzle 182 for injection of said fuel into the combustion chamber 222 as below described. A conventional air filter 186 provides for passage of air therethrough into an air manifold chamber 188 in housing 160 and thence through the orifices as 190 and 191 in the shaft 155 for passage therefrom through chamber 187 inside shaft 55 to the inlet chamber portion 192 of the sub-assembly 152.

The free edge of shell 156—the edge distance from plate 164—has a central groove 168. A longitudinally (along axis of shell 156) resilient ring seal 169 is located in groove 168 and forms a gas-tight seal between said shell edge and the face plate 164. A similar groove is provided at the free edge 176 of the shell 166 and a similar seal 179' provided therein to gas tightly seal cylinder 166 at its free edge with the inner flat surface 154–A of the wall 154.

A similar sealing ring 196 is provided at the free edge 198 of the shell 166 to provide a gas-tight seal between said shell and the wall surface 154–A.

The outside radius of the shell 156 plus the length of the displacement of the axis of shaft 155 from the axis of shaft 163 is the internal radius of shell 166: The outside radius of shell 165 plus the length of displacement of the axis of shaft 155 from the axis of shaft 163 is the internal radius of shell 156. An ear 194 passes from shell 165 to shell 166 and extends the full length of said shell. It is attached firmly to and extends radially from the outside edge of shell 165 to inside edge of shell 166. It is imperforate.

Shell 156 is C-shaped and ear 194 is located as shown in FIGURES 21 through 27 to fit in the space between the arms of the C. One U-shaped sealing element 122 extends the length of shell 156 on one edge 123 of shell 156 and smoothly yet slidably fits thereover. Another sliding element 124 similarly extends on the other shell 156 edge 125. Spring 126 is located in the hollow of seal 122 and a spring 127 is located in the hollow of seal 124 to provide a substantially gas-tight seal across shell 156, notwithstanding the motion of such shell along the radial (relative to axes of shells 165 and 166) length of ear 194. The shell 166 is provided with cavities 128–A and 128–B to receive seals 122 and 124 when shell 156 is in the position shown in FIGURE 23 and shell 165 is provided with cavities 129–A and 129–B to receive sealing elements 122 and 124 when shell 156 is in the position shown in FIGURE 26.

The end plate 154 thus contacts three chambers; (1) the central cylindrical inlet chamber 192, having its axis coaxial with shaft 155; (2) the crescent-shaped combustion chamber 222, of which shell 166 forms the outer wall, and shell 156 the inner wall; and (3) the compression chamber 202 of which shell 165 forms the inner wall and shell 156 forms the outer wall.

These chambers are accordingly sealed substantially gas-tight from each other except for orifices therebetween as hereinbelow described.

An orifice 200 in shell 165 permits passage of gas from chamber 192 to chamber 202. This orifice is of substantial size and on the clockwise side of ear 194 as seen in FIGURES 21–26 and may be pluralized to allow a minimum of resistance to inflow of gas to chamber 202 from chamber 192. No other valve is required as the shells 165 and 156 cooperate to provide a valve as well as a pump action at their substantially gas-tight line of contact 218. The end plate 154 also has a compressed gas outlet orifice 204 near the juncture of ear 194 with shell 166 on the opposite side of ear 194. This orifice 204 opens to the air compression chamber 202 in the positions shown in FIGURES 21 and 22, and is adjacent the shell 156 inner surface.

The end plate 154 also has on the same side of the ear 194 as orifice 200 a compressed gas inlet orifice 206 opening to combustion chamber 222 in the position shown in FIGURES 21 and 22. A one-way valve 208 connects orifices 204 and 206. The orifices are rectangular in shape with the corners of the rectangle rounded and the long side-to-side axis of the rectangle normal to a radius from the center of shaft 155 to the center of such rectangle. A spark plug well 284 for plug 210 is located on plate 154 clockwise of the gas inlet orifice 206 and the well 183 for nozzle 182 is located therebetween. An exhaust orifice 212 is located in shell 166 on the side of ear 194 opposite to that whereat orifice 200 is located and near to the ear 194. Items 206, 284, 183 are adjacent the outer surface of shell 156.

The operation of the engine of FIGURES 17–20 is diagrammatically shown in FIGURES 21–26. The air from chamber 188 fills the chamber 192 and enters the space 202 between shell 165 and shell 156, as a relative vacuum had been created in space 202 theretofore, as below described. The gas passes from the chamber 192 into the space 202 through the orifice 200.

As shown in FIGURE 22, the gas in portion 214 of chamber 202 is then compressed on the counter-clockwise rotative motion of the ear 194, while portion 216 of chamber 202 increases in volume. The portions 214 and 216 are separated by the line 218 of contact of shells 156 and 165.

As shown in FIGURE 21 the portion 216 located between shell 156 and 165 and to the clockwise side of the ear 194 progressively increases in volume through the stages shown in FIGURES 21, 22, 23, 24, and 25 to a maximum volume as shown in FIGURE 26. This provides an increasingly relative low pressure or vacuum zone for encouragement of the flow of air for the combustible mixture from the chamber 192 into the chamber 202 for filling chamber 202 for purposes of subsequent compression thereof and passing to the combustion chamber as hereinbelow described.

The gas compressed in chamber 202 passes at the phase shown in FIGURE 24 via orifices 204 and 206 into the combustion chamber 222 through the valve mechanism 208 below described.

Combustion as at the phase shown in FIGURE 25 of the mixture in portion 220 of chamber 222 is followed by expansion of the gas in that chamber as shown in the sequence of FIGURES 25, 26, 21, 22 and 23. The exhaust valve orifice 212 is located at a point about 10° in advance of the ear 194. Accordingly it comes into operative connection with portion 224 of the chamber 222 when the combustion gas has reached the volume shown in FIGURE 23. At that point the combusted gas begins to exhaust through orifice 212 and continues to empty as shown in FIGURES 23, 24, 25 and 26 and 21 and 22. During this phase the gas in the combustion portion 220 of chamber 222 drives the gas in the exhaust portion 224 of that chamber via the ear 194 to drive the gas formed in the prior combustion cycle, i.e. that portion of the gas to the counterclockwise portion of ear 194 as shown in FIGURE 24 and compresses that gas and thereby serves to exhaust it from the combustion chamber. Portions 220 and 224 are separated from each other by the line of contact 226 between shells 156 and 166.

Thus, according to the arrangement in this invention there occurs simultaneously the intake and compression of air or gas and the development of a vacuum within portions of the chambers 202 and 222 as shown in FIGURES 22 and 21. Also during that same cycle in a slightly later phase, shown in FIGURES 24 and 25, gas or the compressed fuel mixture passes from the compression chamber 202 into a portion of the combustion space between shell 156 and 166. Combustion and a positively driven exhaust occur together (as in FIGURES 25, 26, 21) with development of vacuum and intake of fuel mixture in air.

Therefore, according to this invention, there concurrently occurs during each revolution of this engine, intake of air or gas, development of vacuum, while exteriorly thereto there is occurring combustion and expansion of combustible mixture and expulsion of combusted mixture. This is accomplished with a minimum of relative moving parts, i.e., only the ball bearings 158 and 159 and 158–A and 159–A and sealing members along the ear 194 and surfaces 154–A and 164–A. Accordingly, there is a minimum of friction and an extremely high mechanical efficiency.

Thereby the engine according to this invention provides a very high power to weight ratio at an extremely efficient thermal and mechanical operation.

The valve generally shown as 208 which provides one-way passage of gas mixtures between the chambers 202 and 222 has a combustion chamber inlet orifice 206 and a compression chamber outlet orifice 204. It comprises a sturdy hollow casing 247 enclosing a valve chamber 248 and a longitudinally movable piston 249 therein. The piston 249 has an upper frustoconically shaped closing valve head 251 and a lower T head 253. A closure plate 255 at one end of chamber 248 also provides a fixed base plate against which compressed valve spring 257 acts. A conical seat 258 in casing 247 provides for seating head 251 and sealing orifice 206 from open communication with orifice 204. A valve shaft 259 with a threaded end 260 and adjustment nut 262 thereon is attached to plate 251 and connects the T head 253 and the valve head 251. This assembly provides that gas entering the orifice 204 from chamber 202 passes through inlet orifice 264 in the housing 247, and when the pressure of said gas is sufficiently distinctly higher than the pressure in the chamber 222 the head 251 is forced upward against the action of spring 257 and thereby communication between the chambers 202 and 222 is effected for as long a period as is desired; and communication is automatically closed off without cam shaft or other gears. A closing head 266 closes one end of the housing 247 and another screwed closing head 267 closes the other end of said valve 208.

The gas escaping past the valve head 251 passes through the outlet orifice 269 of the chamber 247 to the inlet orifice 206 of chamber 222.

According to a preferred embodiment of this invention the interior surface of shell 156 is provided with a plurality of inwardly and radially projecting longitudinally extending seals such as 271, 272, 273, 274, 275, and 276, each of which extends parallel to the axis of said shell from surface 154–A to 164–A along the interior of said shell and are equally spaced from each other along the interior of said shell.

These seals each comprise a T-shaped channel fitting into a T-shaped groove therefor and are spring loaded. Each seal is located as 271 in a corresponding groove in the supporting shell, as 156, therefor as groove 281 for seal 271, groove 282 for seal 272, groove 283 for seal 273 as shown in FIGURE 23.

The shell 166 has corresponding inwardly and radially projecting seals as 277, 278 279 in corresponding grooves 277–A, 278–A and 279–A.

These seals, as 271–276 reduce friction between the adjacent shells as 165 and 156 while making positive the gas-tight separation otherwise effected by the substantially gas-tight line of contact, as 218 between the portions 214 and 216 of chamber 202. Seals as 277–279 also reduce friction between the adjacent shells or cylinders 166 and 156 and make positive the gas-tight separation between portions as 232 and 224 of chamber 222, otherwise effected by the substantially gas-tight line of contact 226.

The lines of contact as 218 and 226 and the axes of the seals as 271–273 and 277–279 are parallel to each other and to the axes of the shaft 155 and 163.

Each seal, as 272, has a central portion 277' and a cross-piece, as 278', firmly attached thereto. Each groove, as 282, has a radial portion as 284', and a circular portion as 285. The central portion 277' slidably fits into the radial portion 284' and is held in toward the shell supporting said seal, as 156, thereby. A spring, as 286, lies in the bottom end of each portion as 285 and has a sufficiently resilient amount of yield to permit the portion 277 of the seal to resiliently slide radially toward its supporting shell, as 156, to a position whereat its edge as 288 is coplanar with the adjacent edge of the supporting shell, i.e. the depth of the radial portion of each groove as 284, plus the depth of the circular portion as 285 from the inner surface of the supporting cylinder, as 156, less the distance radially occupied by the spring positioning the cross portions as 278' against the shoulders, as 290A and 290B, is the length of the central portion 277' of the seal, as 272. Each of the seals is put into its groove during the assembly of the machine from the free edge of its supporting cylinder, as 156.

The speed and fuel control mechanism 230 for the apparatus of FIGURE 17 comprises a fuel feed sub-assembly unit 300, and an air feed sub-assembly unit 302. The fuel feed sub-assembly unit 300 comprises a periodic fuel injection sub-assembly 304 and a fuel adjustment sub-assembly 306.

The fuel feed sub-assembly unit operates through the shaft 155 of sub-assembly 152 and serves to actuate the ignition assembly as well, as shown in FIGURES 28 to 37.

Generally, speed is controlled by controlling the quantity of fuel injected at each stroke of fuel injection piston 334.

The fuel injection sub-assembly 304 comprises a solid cylindrical piston 334 that reciprocates along the axis of the bore 325 of an axially rotating concentric cylinder 310. The walls of the cylinder are provided with orifices therethrough as 312, and 313, opening to a manifold, 315, which encircles the outside surface of cylinder 310. This manifold is fixed in position and connected by a conduit as 317 to a source of combustible fuel for injection into the combustion cylinders. The manifold 315 is fixed in position, by bracket 316 which is firmly attached thereto and to housing 160. The manifold has a gas tight fit, by O-rings 318, 319 to the outside surface of cylinder 310. The cylinder 310 has a gas tight fit with the shaft 155 as by O-rings 321, and may be also threaded or keyed in place on engine shaft 155. A conduit 323 passes from the bore or the inner volume 325 of cylinder 310 to the conduit 181 in chamber 187 from which conduit the fuel is passed to the injector nozzle 182.

A solid cylindrical piston 334 reciprocates with a gas tight fit within the bore 325. Piston 334 is firmly connected by a forward piston shaft 326 to a piston shoulder 327 and a rearwardly projecting piston shaft portion 329. The piston 334 is moved back and forth in the bore 325 along its longitudinal axis on each revolution of the shaft 155. As below described the rotation of the shaft 155 provides for a reciprocation of the piston 334 from its rearmost position in bore 325 shown in FIGURE 28 to its most advanced position shown in dotted lines as 31A in order so to move fluid fuel from the source of the fuel via conduit 317 to the injector 182.

The fuel injected into the manifold 315 passes into the bore 325 and is accordingly periodically moved by the piston 334 to conduits 323 and 181 to the nozzle 182 into the combustion chamber 222 on actuation of the apparatus of FIGURE 17 as above described. The shaft 329 is supported in a reciprocable housing 330 with a smooth fit permitting oscillation and rotation of said shaft; this movement however does not interfere with the gas tight fit of the piston 334 in the bore 325 where such piston is provided with conventional rings and seals 331.

The shoulder 327 is provided with front ball bearings indicated generally as 332A and rear bearing 332B; these bearings locate shoulder 327 in a cylindrical cavity 333 in housing 330. The bearings smoothly fit in the cavity.

A fixed base 335 with a sleeve 336 is keyed by a key 337 to the housing sleeve 330. This housing sleeve is firmly attached to a fuel injector cam 341. A shoulder 343 on sleeve 336 supports a spring 345 which presses against a shoulder 346 of the injector cam 341. This cam coacts with a companion cam member 342 as described in relation to FIGURES 31 and 36 discussed below, as to provide, on each rotation of the shaft 155, that the fuel injector piston 334 will move its predetermined displacement at the proper time in the engine cycle.

The feed adjustment sub-assembly 306 comprises a feed adjustment handle 361 which is firmly attached to a feed adjustment sleeve cam 362 having a spiral surface 364. This sleeve 362 smoothly fits on and is rotatable about the housing sleeve 330 supported by base 335. The cam sleeve 362 smoothly yet slidably fits over the housing 330 and against face 338 of sleeve 336 to engage the spiral surface 365 of a second feed adjustment cam 366 which is keyed at 367 to the housing 330. Accordingly, rotary motion of the handle 361 about the axis of shaft 155 will move the cam 366 relative to shaft 329. The distance of the end 368 of the cam 366, from the cavity 333 for shoulder 327 is fixed by a threaded head 369 on sleeve 330. The pitch and diameter of spiral faces 364 and 365 are the same and provide a smooth fit against each other.

The shaft 329 is held in position relative to the housing 330 by the ball bearings 332A and 332B. Accordingly, on rotation of the handle 361 the housing screw head 369 is moved backward along shaft 329 as shown in FIGURE 37, and, accordingly, the piston 334 is moved backward from its position shown as 334 in FIGURE 28 to the dotted line position 37A shown for the position of that piston when the handle 361 is in position shown in FIGURE 37. Thereby the amount of fuel injected in any one injection cycle is controlled by the operator.

The fuel injector cam members 341 and 342 are two identical cams which serve to provide a positive displacement and return of piston 334 in bore 325 once each 360° revolution of the shaft 155. The predetermined displacement of the fuel injector piston 334 is from the position 334 shown in FIGURE 28 to the position indicated in dotted lines as 31A in the position of the handle 361 shown in FIGURES 28 and 29.

The cam 341 comprises two concentric cylinders 351 and 352, an inner cylinder 351 and an outer cylinder 352. With the same structure as 341, cam 342 comprises corresponding cylinders 351A and 352A. The outer cylinders 352 and 352A are provided with spirally sloped faces 353 and 353A which slope gradually while passing in a counter clockwise direction from its shortest point 354 (and 354A for item 342) to its highest point 355 (and 355A for item 342). A sharply sloped portion 356 (and 356A for item 342) joins the highest and lowest points.

The inner cylinder 351 of the cam member 341 provides a spirally sloped face portion 357 which passes from its low point 358 to its high point 359 and these points are joined by steep portion 360. The pitch of the spiral portion 353 (and 353A) and the pitch of the spiral portion 357 and 357A are identical as measured in distance along the axis of the shaft 329.

In a preferred embodiment of this invention the outer diameters of the cams 341 and 342 are 1 1/16 inch. The diameter of the smaller ring 351 and 351A would be 3/4 inch and the pitch, i.e., the axial distance between the points 354 and 355 which would be the same as the distance between points 358 and 359 and is 0.25 of an inch thereby allowing for a throw of 1/4 of an inch. The axial movement backwards from the high point as 359 to the low point 358 would occur within 1/4 inch.

The radial distance for such change in axial location of the high and low point on the inner cylinders 351 and 351A would be 7/32 in. while the radial distance along the outer cylinder 352 and 352A would be 9/32 inch so that for the same radial motion there would be no twisting of the cams about the shaft 329.

The relations of the cams are shown in FIGURES 31 through 36. FIGURE 31 is a top view showing the surface 353 of cam 341 in contact with surface 353A of the cam 342. FIGURE 32 is a broken away section to show the position of the outer cylinders 352 and 352A of the cams 341 and 342 respectively and to also show the location, as seen from the top of the outer cylinders 351 and 351A, of cams 351 and 351A. At this point in the operation of the machine of FIGURE 17 the front of piston 334 is at the position 31A of FIGURE 28.

The cam 342 is keyed to cylinder 310: cylinder 310 is firmly attached to shaft 155 and rotates therewith while cam 341 is firmly attached to housing 330. Housing 330 may longitudinally reciprocate but does not rotate about shaft 155. Accordingly, the axial displacement and displacement and motion of piston 334 is controlled by the rotation of shaft 155 of subassembly 152. The cams 341 and 342 are arranged to inject fuel into conduit 323 and 181 and chamber 222 shortly prior to when plate 154 is in the position shown in FIGURE 25, i.e., immediately prior to initiation of combustion in chamber 222.

FIGURE 33 shows cams 341 and 342 after a partial rotation of about 90° from the position of parts shown in FIGURES 31 and 32. At such point the spiralled surfaces 357 and 357A are smoothly in contact at the bottom of shaft 326: as shown in FIGURE 34, which is broken away in part to show the separation of portions 360 and 360A, at the position shown ni FIGURE 33, portions 353 and 353A are smoothly in contact on top of shaft 329. This causes a limited leftward motion, as seen in FIGURE 28 and FIGURE 29, of cam 341, shoulder 327, and shaft 329, and moves the front (right hand edge as seen in FIGURE 28) of piston 334 to position 33A in FIGURE 28.

FIGURES 35 and 36 show the relative positions of the cams 341 and 342 on still further rotation of such cams with respect to each other to a position 330° subsequent to the position shown in FIGURE 31. In this position of cams 341 and 342 the piston 334 is at the position shown in FIGURES 28 and 29. Handle 361 controls this maximum rearward piston location. Piston 334 then is moved well leftward of the conduits 312 and 313 and fuel from conduit 317 passes into the bore 325. The time of opening of the bore 325 to the conduit 317 is sufficient for filling of bore 325. The conduits as 312 and 313 in housing 310, fixed to shaft 155, lose communication with the manifold cavity 314 shown in FIGURE 28 prior to the movement of piston 334 to the right—to position 31A.

On rotation of cam 342 (attached to housing 310 and thereby to shaft 155) with respect to cam 341 (firmly attached to housing 330 and thereby to the fixed support 335), in a counterclockwise direction as shown by arrow 350 to beyond the position shown in FIGURES 35 and 36 the points 359 and 359A rotate past surfaces 357A and 357 respectively on to portions 360A and 360 respectively. Thereupon spring 345 drives cam 341 and thereby sleeve 330, cavity 333 therein, shoulder 327, and shaft 326, and piston 334 to the position 31A. This compresses and drives the fuel from bore 325 to conduits 323 and 181 and thence to combustion chamber 222. This occurs in the preferred embodiment while air is passing from orifice 204 to orifice 206. The length of the cycle allowed for said fuel injection is determined by the angle subtended by the radial distance 349 between points 354 and 355 on cylinder 352 and corresponding points 358 and 359 on cylinder 351. Accordingly, a precise and reliable control of the injection time is readily obtained and a coordination with the position of chamber 202 and 222 is reliably achieved.

The injection nozzle 182 is located in a well 183 in wall 154 between the air inlet orifice 206 to the combustion chamber, 222, and the well 284 for the spark plug, 210. Thereby the turbulence of the inlet air from 206 carries the combustible gas from the fuel injector nozzle 182 to the spark plug 210, thus creating a high content of gasoline or combustible mixture in the vicinity of the spark plug at the time of the spark and thereby provides a maximum thermal efficiency.

In the preferred embodiment of the engine of FIGURE 17, the external diameter of shell 165 is 6¼ inches, and the thickness of that shell is ⅜ of an inch; the length of such shell from wall 164A to wall 154A is 4 inches. The external diameter of shell 156 is 8⅝ inches and the thickness thereof is 5/16 of an inch; the inside diameter of the shell 166 is 10⅜ inches and the thickness of such shell is ⅜ of an inch: all such shells have the same length.

The spark plug 210 is ignited by a wiper, as 287, which is connected to a conventional ignition coil 289 for actuation of such plug at the appropriate time in the cycle of operation of the apparatus of FIGURE 17.

In the embodiment of FIGURE 17, the injector 182 as shown in FIGURE 44 comprises a housing body 431 and a jet nozzle 420. The jet nozzle 420 is constructed in two halves, 420A and 420B, which are separate from each other along their length; they are placed together and pressed into the housing 431 which is screwed into plate 154 with such a fit as will present a smooth closed surface to the combustion chamber 222. The jet nozzle 420 has a hollow interior 470, communicating through the hollow core 480 of the housing 431 to the tubing 181, which tubing is firmly held by housing head 433 to the body of the housing 431.

The jet nozzle is pressed into the housing 431 in plate 154 with such fit as will hold it in leak proof relation to the combustion chamber 222 until the desired fuel injection pressure is reached. Thereupon said pressure opens the jet by pressing the halves apart. This provides a very thin slit through which the fuel is sprayed into the combustion chamber with a uniformly high degree of atomization, as the opening is so small that the elasticity of the housing, 431, is adequate to close the jet between the pressure periods. As the sub-assembly 152 approaches its combustion phase of movement, pressure in the interior 470 of jet nozzle 420 is relieved and jet slot 454 is closed by stress of its surrounding housing. Since the amount of movement of the jet halves in opening slot 454 is so very small, the elasticity of the material of its housing can be used to allow opening of jets during pressure pulses and to close them as pressure is removed.

FIGURE 38 is an enlarged cross-sectional view of an injector within the scope of this invention whereby to inject fuel directly into the combustion chamber. This injector comprises an injector housing 432, a plunger 421, check valves 438A and 438B, body 431, and a jet nozzle 420. The plunger 421 is actuated by contact with a cam, as 427, when the plate 154 of sub-assembly 152 nears the position thereof for fuel injection. The cam actuates the plunger 421 thereby compressing fuel trapped inside injector housing 432 by check valves 438A and 438B. When the fuel pressure rises to a predetermined desired point jet halves 420A and 420B of jet nozzle 420 are pushed apart to open a very fine slot 454 through which fuel escapes into combustion chamber 222 after having been thus very finely and uniformly atomized as it thus leaves the jet. The apparatus of FIGURES 28 to 37 is preferred over that of FIGURE 38.

It will be thus seen that, according to my invention, the normal operation of the rotation of the various components provide for sealing off the air compartment (portion 214 of chamber 202 and chamber 89 in the embodiment of FIGURE 1) without requiring separate valving structure therefor.

The arrangement of the portions of 224 and 220 of the combustion chamber 222 of the embodiment of FIGURE 17 also provides that the pressure of the exhaust gas may be as low as desired at the time when the exhaust port 212 is first reached by the combustion gases as shown in FIGURE 23. This is so because the subsequent cycle of combustion gas will drive such combusted gases out of the exhaust port. It is preferred that the pressure in chamber 222 when exhaust port 212 is first open to the combustion chamber 222 should be atmospheric or only slightly thereabove and for this purpose the maximum volume of the inlet chamber 202 is arranged to be the same as that of the combustion chamber 222 and chambers 89 and 87 maximum volumes are equal.

While the relationships shown in FIGURES 21 through 26 are diagrammatic, the actual movement of the chambers 202, 220, and 222 with respect to each other provide that there is a substantially equal maximum volume in chamber 202 and in 222; thereby the combustion gases are only slightly over atmospheric pressure when they are initially exhausted. Thereby an improved mechanical and thermal efficiency is obtained and also requirement of a muffler avoided. A compression ratio of 9 to 1 is obtained in chambers 89 and 214.

It is within the scope of this invention that the material which is combusted in the combustion chamber 222 in the embodiment of FIGURE 17 may be a fuel-air mixture such as 79 used in the embodiment of FIGURE 1 and formed by the conventional carburetor 80 in that embodiment. It is also within the scope of this invention that the fuel injection system comprising a separate air inlet and fuel injection system as in the embodiment of FIGURES 17 through 27 may be used in the embodiment of FIGURE 1 in lieu of the use of the combustible gas-air mixture 75 shown for that particular embodiment of FIGURE 17. Nevertheless, separate system for the injection of fuel through a nozzle into the combustion chamber is preferred.

Figure 15:
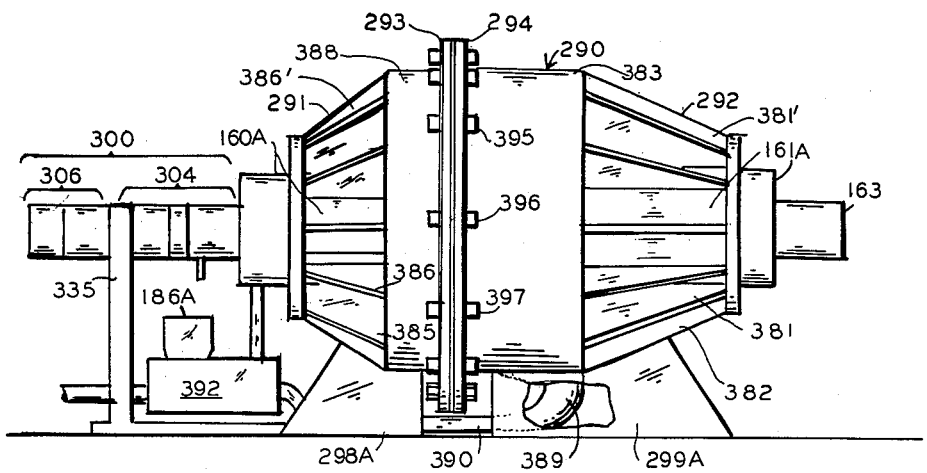
FIGURE 15 is a side view of another embodiment of apparatus to this invention.
Figure 16:
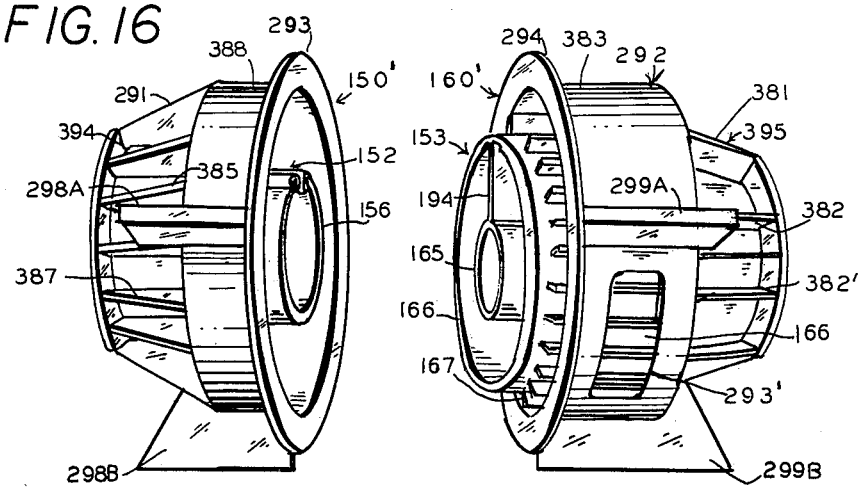
FIGURE 16 is a perspective view of the interior of sub-assembly 150 and a perspective view of the interior of sub-assembly 160 of the apparatus shown in FIGURE 15 partially disassembled.

FIGURES 15 and 16 show another embodiment of engine according to this invention. In this embodiment a cylindrical shell 290 is used in place of the frame work elements 170, 171, 173, 174, 177, 178, and 179 of frame work 151. Otherwise the apparatus is the same as shown in FIGURES 17 through 37. The shell 290 is composed of two matching generally frusto-conical units 291 and 292.

Shell 291 is composed of an imperforate shell body 394, flange 293 and housing 160A. Shell 292 composes a body 395, flange 294, and housing 161A. Unit 152 is held in housing 160A a shell portion 291 to form the unit 150' of FIGURE 16 while unit 153 (of FIGURE 17 through 37) is supported in housing 161A of shell 292 and form the unit 160' of FIGURE 16. The units 152 and 153 rotate freely in their respective housing portions. The flange 293 of the unit 291 and the flange 294 of the unit 292 are firmly fastened together by bolts as 395, 396, 397 and serve to hold the units 150' and 160' together. Feet 298A and 298B on unit 291 and footing 299A and 299B on unit 292 serve to support these units on the ground.

The frustoconical outline of unit 292 is due to the use of a plurality of generally triangularly shaped trapezoidal similar ribbing elements as 381, 381', 382, and 382' which extend between and are attached to a cylindrical housing portion 383 of large internal diameter. Sub-assembly 153 rotates within the cylinder portion 383. The housing portion 383 is supported on the ground or other support by its feet 299A and 299B. The ribbing elements as 381, 381', 382, and 382' are attached to and firmly support the housing 161A on portion 383. The shaft 163 of sub-assembly 153 is rotatably supported in housing 161A in the same manner as above discussed for housing 161. The frustoconical outline of unit 291 is due to the use of a plurality of similar triangularly shaped trapezoidal elements as 385, 386, 386', and 387 which extend between and are attached to a cylindrical housing portion 388 of the same internal diameter as housing portion 383. The housing portion 388 is supported on the ground or other support by its feet 298A and 299B. The ribbing elements as 385, 386, 386', 387 are attached to portion 388 and housing 160A and firmly support the housing 160A. The shaft 155 of sub-assembly 152 is rotatably supported in housing 160A as above discussed for housing 160.

FIGURE 16 is a perspective bottom view to illustrate the exhaust port or window 293' and the general relations of sub-assemblies 152 and 153 prior to their cooperative assembly. Window 293' and the shells 291 and 292 provide for limiting the discharge of the exhaust gases from chamber 222 to a definite location. The thus-confined exhaust gases may then be discharged where desired.

This structure also provides for recovering the exhaust gases, as by a manifold 389, which receives the discharge gases from port 293' and operatively connects to a conduit, as 390, which leads to a heat exchanger, as 392. Intake air is passed from a filter 186A to exchanger 392 for heat exchange with the exhaust gases without admixture therewith. The thus-heated intake gases from the exchanger 392 pass to a chamber in housing 160A such as chamber 188 of housing 160.

For the embodiment of FIGURES 15 and 17, a conventional make and break ignition system with contact points supported on a bracket 370 firmly attached to the fixed support 335 is actuated by timing cam 371 fixed on the shaft 329. The cam 371 is adjusted to initiate ignition through a battery 372 and coil 289 to actuate spark plug 210 on plate 154.

A feature of this invention is the provision of structures as above described providing a low difference of speed between adjacent and contacting moving parts. For example, in the engines of this invention, on each revolution of the output shaft, as 163 (or 63) corresponding to a roughly 33-inch travel of the periphery of the ear 194 (or 86 in the case of shaft 63), there is only a roughly 3½ inch total back and forth travel of the cylinder 156 (or 56 in the case of shaft 63) relative to the cylinders 165 and 166 (or 66 in case of shaft 63) coacting and in contact with said cylinder 156 (or 56 in case of shaft 63). Accordingly, notwithstanding the large travel of a power output member, as plate 164 and the shaft 163 attached thereto (or plate 64 and shaft 63 attached thereto), there is a low distance or amount of travel and a corresponding low energy loss and low amount of wear at the contact of the adjacent contacting surfaces as well as a relatively low speed of contact between such surfaces. Further, the friction developed between such moving and contracting surfaces is that developed by low speed motion between such parts rather than by high speed motion therebetween.

The particular sizes of chambers 89 and 87 illustrated (150 cubic inches each for the embodiment shown for FIGURE 1) may vary in absolute size and size relative to each other, as by variation of the sizes of shells 93 and/or 84—while maintaining the above discussed relations of radii of such cylinders and the cylinders adjacent thereto and the displacement of axes of shafts 55 and 63 from each other—to provide for a wide degree of compression of air or gaseous mixture passed from compression chamber 89 into the combustion chamber 87, as desired.

Similarly, the size and relative size of chambers 202 and 222 may be varied—within the above described relations of internal and external radii of adjacent cylinders and the distance between shafts as 163 and 155 associated therewith—to provide a wide degree of compression of the compressed air in the chamber 214 passed to portion 220 of chamber 222. The volume of chamber 214 is measured at the maximum volume thereof for this purpose and is the volume bounded by the line of contact 218 immediately clockwise of the clockwise edge of orifice 200 as shown in FIGURE 21, ear 194, shells 165 and 156 and surfaces 164A and 154A. The volume of the combustion zone 220 for this purpose is measured by the maximum volume contained between surfaces 154A, 164A, ear 194, shells 156 and 166 prior to initiation of combustion in that chamber.

Although, in accordance with the provision of the patent statutes, particular preferred embodiments of this invention have been described and the principles of the invention have been described in the best mode in which it is now contemplated applying such principles, it will be understood that the constructions shown and described are merely illustrative and that the invention is not limited thereto and, accordingly, alterations and modifications which readily suggest themselves to persons skilled in the art without departing from the true spirit of the disclosure hereinabove are intended to be included in the scope of the annexed claims.

I claim:

1. An internal combustion engine comprising a first rotating sub-assembly and a second rotating sub-assembly, said first rotating sub-assembly comprising an end wall plate, one side of which has a flat surface, and a first, outer, hollow cylinder attached thereto with the axis of said first hollow cylinder normal to the plane of said flat plate, a first shaft with its axis coaxial with the axis of said first hollow cylinder attached to the other side of said end plate, a fixed first shaft housing rotatably supporting said shaft, said second rotating sub-assembly comprising a second shaft and a second hollow cylinder attached thereto and co-axial therewith, a second fixed shaft housing rotatably supporting said shaft of said second rotating sub-assembly, said second hollow cylinder having a lesser outer diameter than the inner diameter of the first, outer, hollow cylinder and located therein, said second hollow cylinder having its longitudinal axis parallel to but displaced from the axis of the first hollow cylinder, whereby said shafts rotate at a fixed distance and in a fixed directional relationship and parallel to each other, the outer radius of said second hollow cylinder plus the displacement of its axis from the axis of the first hollow cylinder being the inner radius of said first hollow cylinder being the inner radius of the outer cylinder whereby a gas-tight line of contact is formed and maintained between the adjacent surfaces of said end wall plates and of said two cylinders, a second flat end wall plate extending parallel to said first plate at the other end of said first hollow cylinder and forming a gas-tight connection therewith, and a closure plate extending in a plane normal to said flat surfaces from the said outer surface of said inner cylinder to said outer cylinder inner surface for the length of said first and second cylindrical surfaces, one of said surfaces being an incomplete cylinder and there being a longitudinally extending gap in said surface, said closure plate extending through said gap, and seal means attached to said gap in said incomplete cylinder and slidably contacting said closure plate and forming a gas-tight seal therewith, said closure plate forming a gas-tight contact with the first and second flat end wall plates as well as with the inner and outer cylinders thereby forming two chambers between the outer cylinder and the inner cylinder, one such chamber being bounded by a portion of the outside surface of the inner cylinder, a portion of the inside surface of the outer cylinder, a portion of each of the two flat end walls, one side of the closure plate and the line of contact between the inner and outer cylinders, and the other of said chambers being bounded by the remainder of the inner surface of the outer cylinder, the remainder of the outer surface of the remainder of each of the inner cylinders, the two flat end walls, the line of contact between the inner and outer cylinders and the other side of said closure plate, there being also an exhaust orifice in one portion of one of said chambers, and a fuel inlet opening for injecting components of a combustible mixture into another portion of said chamber and means for injecting a combustible mixture operatively connected to said fuel inlet opening.

2. Apparatus as in claim 1 comprising also fuel ignition means, actuation means for said injection and ignition means operatively connected thereto, said actuation means being contacted by means attached to a housing means of one of said sub-assemblies and at a predetermined position of one of said rotating sub-assemblies.

3. Apparatus as in claim 2 wherein the fuel injection means comprises two matching mirror image longitudinal halves adjacent each other, and forming a hollow interior between said halves, a slot between said halves, said slot opening from said interior to the exterior of said valve, a housing closely fitting around said halves and having sufficient elasticity to force said halves together and close the slot between said halves.

4. An internal combustion engine comprising a first rotating sub-assembly and a second rotating sub-assembly, said first rotating sub-assembly comprising an end wall plate, one side of which has a flat surface, and a first outer hollow cylinder attached thereto with the axis of said first hollow cylinder normal to the plane of said end plate, a first shaft with its axis coaxial with the axis of said first hollow cylinder attached to the other side of said end plate, a fixed housing rotatably supporting said first shaft, said second rotating sub-assembly comprising a second shaft and a second hollow incomplete cylinder attached thereto and coaxial therewith, a second fixed shaft housing rotatably supporting said second shaft whereby said first and second shafts rotate at a fixed distance and in a fixed directional relationship and parallel to each other, said second hollow cylinder having a lesser outer diameter than the inner diameter of the first hollow cylinder and located therein, said second hollow cylinder having its longitudinal axis parallel to but displaced from the axis of the first hollow cylinder, the outer radius of said second hollow cylinder plus the displacement of its axis from the axis of the first hollow cylinder being the inner radius of the outer cylinder whereby a gas-tight line of contact is formed and maintained between the adjacent surfaces of said two cylinders, a second flat end wall plate extending parallel to said first plate at the other end of said first hollow cylinder and forming a gas-tight connection therewith, and a closure plate extending in a plane normal to said flat surface of said end wall plates through the said second incomplete cylinder to said first outer cylinder inner surface for the length of said first and second cylindrical surfaces, said closure plate forming a gas-tight contact with the first and second flat end wall plates as well as with the second and first cylinders thereby forming two chambers each of which chambers are located between the outer cylinder and the inner cylinder, one such chamber being bounded by a portion of the outside surface of the second cylinder, the inside surface of the first cylinder, a portion of each of the two flat end walls, one side of the closure plate and the line of contact between the inner and outer cylinders, and the other of said chambers being bounded by the remainder of inner surface of the outer cylinder, the remainder of the outer surface of the second cylinder, the remainder of each of two flat end walls, the line of contact between the inner and outer cylinders and the other side of said closure plate, there being also an exhaust orifice in one portion of one of said chambers near said closure plate and a fuel inlet opening for injecting components of a combustible mixture into another portion of said chambers on the other side of said closure plate and means for injecting a combustible mixture operatively connected to said fuel inlet opening, and wherein the first rotating sub-assembly comprises also an inner third hollow cylinder firmly attached to said flat wall plate of said first sub-assembly, said third cylinder having a smaller diameter than the first outer cylinder and an axis concentric with the axis of the first outer cylinder, and the second rotating sub-assembly comprises an end wall plate flat on one side, said flat side facing the flat side of the end wall plate of the first sub-assembly, and said second hollow cylinder is attached firmly to said flat face, the outer diameter of said third hollow cylinder being smaller than the inner diameter of the second cylinder by the distance of displacement of the axis of the shaft of the first sub-assembly from the axis of the shaft of the second sub-assembly, and the second hollow cylinder is incomplete and C-shaped and the ends of the arms of which C form the edges of a longitudinal axial slot, and which edges embrace both sides of the closure plate with a gas-tight seal, the closure plate extending from the first outer hollow cylinder to the third hollow cylinder and wherein the difference in radii between the inside cylindrical surface of the second cylinder and the cylindrical outside surface of the third cylinder is the distance of displacement of the axis of the first shaft from the axis of the second shaft and one line of contact forms between the first and second cylinders' adjacent surfaces and another line of contact is formed between the adjacent surfaces of the second and third cylinders, and said lines of contact are substantially gas-tight.

5. Apparatus as in claim 4 wherein the line of contact between the second cylinder and the third cylinder is, with respect to the axis of rotation of one rotating sub-assembly stationary and, with the closure plate, divides a space between the second hollow cylinder and the third hollow cylinder into two chambers, the size of each of which varies from a minimum to a maximum and the chamber between the first hollow cylinder and the third hollow cylinder has a maximum size and said maximum size is the same as the maximum size of chamber between said second and third cylinders.

6. Apparatus as in claim 5 comprising also fuel injection means and ignition means operatively connected to said chamber between said first and second cylinders, actuation means for said injection and ignition means operatively connected thereto, said actuation means being contacted by means attached to a housing means for one of said sub-assemblies and operating at a predetermined position of one of said rotating sub-assemblies.

7. Apparatus as in claim 5 wherein an exterior housing encircles both first and second sub-assemblies between the shaft housings thereof, a conduit for combustible gas and air to be fed into the chamber between the third and second cylinders passes into a hollow in the shaft of one of said sub-assemblies, and said exterior housing has an outlet orifice therein for exhaust gases exiting from the outlet orifice from said first sub-assembly.

8. Apparatus as in claim 5 wherein each of a plurality of sealing elements extends parallel to the line of contact of one of said cylinders with another of said cylinders adjacent thereto and resiliently protrudes from the surface of said one cylinder towards the surface of said another cylinder and each such sealing element is slidably located in a groove therefor in said one cylinder.

9. Apparatus as in claim 6 and wherein the injection means comprises two matching mirror image longitudinal halves adjacent each other and forming a hollow interior between said halves, a slot between said halves, said slot opening from said interior to the exterior of said valve, a housing closely fitting around said halves and having sufficient elasticity to force said halves together and close the slot between the halves.

10. Apparatus as in claim 5 wherein said second rotating sub-assembly shaft is hollow and the space within said hollow is connected to the space within the third cylinder and the fuel injection means comprises two contacting cams, one of which is fixed to rotate with one rotating sub-assembly while the other cam is non-rotatably supported, said cams each having a cam surface with only one high point and one low point for each 360° rotation of the sub-assembly to which attached.

11. Apparatus as in claim 5 wherein one edge of the closure plate contacts the second end wall plate with a gas-tight seal and the second end wall plate has one orifice extending therethrough on one side of the area of contact of the closure plate interiorly of the second hollow cylinder and a second orifice extends through said end wall plate on the other side of the area of contact of the closure plate therewith exteriorly of the second hollow cylinder and near to said fuel inlet opening and a one-way valve joins said orifices and automatically opens to pass gas towards said second orifice from said first orifice.

(References on following page)

References Cited by the Examiner

UNITED STATES PATENTS

| | | | |
|---|---|---|---|
| 865,206 | 9/1907 | Ranck | 123—16 |
| 1,496,704 | 6/1924 | Caminez | 103—121 |
| 1,525,364 | 2/1925 | Brett | 123—8 |
| 1,636,799 | 7/1927 | Berntsen | 103—121 |
| 1,841,841 | 1/1932 | Munn | 123—8 |
| 2,641,196 | 6/1953 | Falcon | 103—154 |
| 2,775,210 | 12/1956 | Buchmann | 103—154 |

FOREIGN PATENTS

| | | |
|---|---|---|
| 537,527 | 3/1922 | France. |
| 1,026,523 | 2/1953 | France. |
| 756,958 | 9/1956 | Great Britain. |

SAMUEL LEVINE, *Primary Examiner.*

JOSEPH H. BRANSON, JR., KARL J. ALBRECHT, *Examiners.*

R. M. VARGO, *Assistant Examiner.*